United States Patent [19]
Peters et al.

[11] 3,847,581
[45] Nov. 12, 1974

[54] GLASSMAKING DIAMETER SENSING

[75] Inventors: Homer D. F. Peters, Sylvania; Robert R. Rough; William H. Ryan, both of Toledo, all of Ohio

[73] Assignee: Owens-Illinois, Inc., Toledo, Ohio

[22] Filed: July 2, 1973

[21] Appl. No.: 375,677

[52] U.S. Cl................... 65/29, 33/126.7 A, 65/158, 65/160, 65/164, 73/290, 356/164, 356/165
[51] Int. Cl.......................... C03b 5/00, C03b 5/14
[58] Field of Search ............... 65/160, 29, 164, 158; 33/126.7 A, 126, 172 E; 73/290; 356/209, 196, 212, 156, 164, 165, 166

[56] References Cited
UNITED STATES PATENTS

| | | | |
|---|---|---|---|
| 3,754,886 | 8/1973 | Richards et al. | 65/134 |
| 3,716,301 | 2/1973 | Caulfield et al. | 356/165 |
| 3,396,627 | 8/1968 | Rouy et al. | 356/209 |
| 3,502,457 | 3/1970 | Bublitz et al. | 65/164 X |
| 3,417,614 | 12/1968 | Ryder | 356/156 X |
| 3,741,656 | 6/1973 | Schapiro | 356/209 X |

FOREIGN PATENTS OR APPLICATIONS
| | | | |
|---|---|---|---|
| 640,882 | 5/1962 | Canada | 356/196 |

OTHER PUBLICATIONS
Hayunga; Optical Magnetic Tape Defect Inspector; 8/1963; IBM Technical Disclosure Bulletin; page 40.

*Primary Examiner*—S. Leon Bashore
*Assistant Examiner*—Kenneth M. Schor
*Attorney, Agent, or Firm*—E. F. Dwyer; E. J. Holler

[57] ABSTRACT

A method and apparatus for controlling the amount of glass in a mass of glass which is being refined by introducing unrefined molten glass continuously into one end of an open-ended container, rotating the container to provide a void in the mass of glass in the container and cause the gaseous inclusions therein to be removed by the action of centrifugal force, and continuously removing the glass from the other end of the container. In accordance with the method, a portion of the void in the rotating mass of glass is periodically illuminated with light. A marker is positioned in the chamber such that varying portions of the marker are exposed to the light depending upon the thickness of the glass in the chamber. The image of the exposed portion of the marker is then compared with a predetermined standard and any deviation is utilized to control the amount of glass in the chamber.

3 Claims, 8 Drawing Figures

GLASSMAKING DIAMETER SENSING

This invention relates to refining molten glass and more particularly to refining molten glass by subjecting the glass to centrifugal action in a rotating container and particularly to a method and apparatus for sensing and controlling the amount of glass in the container.

BACKGROUND OF THE INVENTION

In the copending U.S. Pat. application of Richards et al., Ser. No. 130,672, filed Apr. 2, 1971, now U.S. Pat. No. 3,754,886, having a common assignee with the present application, there is disclosed and claimed a method and apparatus for refining glass wherein the unrefined molten glass is continuously introduced into one end of an open-ended chamber, the chamber is rotated to form a void and the glass is subjected to centrifugal action to cause the gaseous inclusions in the glass to migrate toward the center of the void and finally the glass is continuously withdrawn from the other end of the open-ended chamber. In order to provide for accurate control of the degree of refining, it is important to know and control the amount of glass in the rotating chamber. Control of the amount of glass in the chamber may be achieved by controlling the flow of glass out of the chamber as by a rod or other device provided in the other end of the chamber to restrict the flow of glass out of the chamber.

In the copending U.S. Pat. application of Homer D. F. Peters et al., Ser. No. 351,458, filed Apr. 16, 1973, having a common assignee with the present application, there is disclosed and claimed a method and apparatus wherein an air probe is moved radially in the void toward the inner surface of the mass of glass. The probe directs air toward the surface of the glass and when the probe reaches a predetermined relationship to the surface of the glass, the probe senses a change in pressure to produce a signal corresponding to the diameter of the void which, in turn, is a measure of the amount of glass in the container.

Among the objects of the invention are to provide a method and apparatus for measuring the amount of glass in the chamber by sensing the diameter of the void in the rotating mass of glass; which will automatically and continuously monitor the amount of glass in the chamber; wherein the sensing is achieved without contact with the glass; which method and apparatus is relatively simple and inexpensive; and which apparatus will withstand the temperatures involved.

SUMMARY OF THE INVENTION

In accordance with the invention, a portion of the void in the rotating mass of glass is periodically illuminated with light. A marker is positioned in the chamber such that varying portions of the marker are exposed depending upon the thickness of the glass in the chamber. Due to the high speed, globules of glass are disposed on the uncovered portion of the marker. Because of the relative reflectivity, when the uncovered portion of the marker is viewed, an image of the globules is provided. The image of the globules of glass of the marker is then compared with a predetermined standard and any deviation is utilized to control the amount of glass in the chamber.

DESCRIPTION

Figure 1:
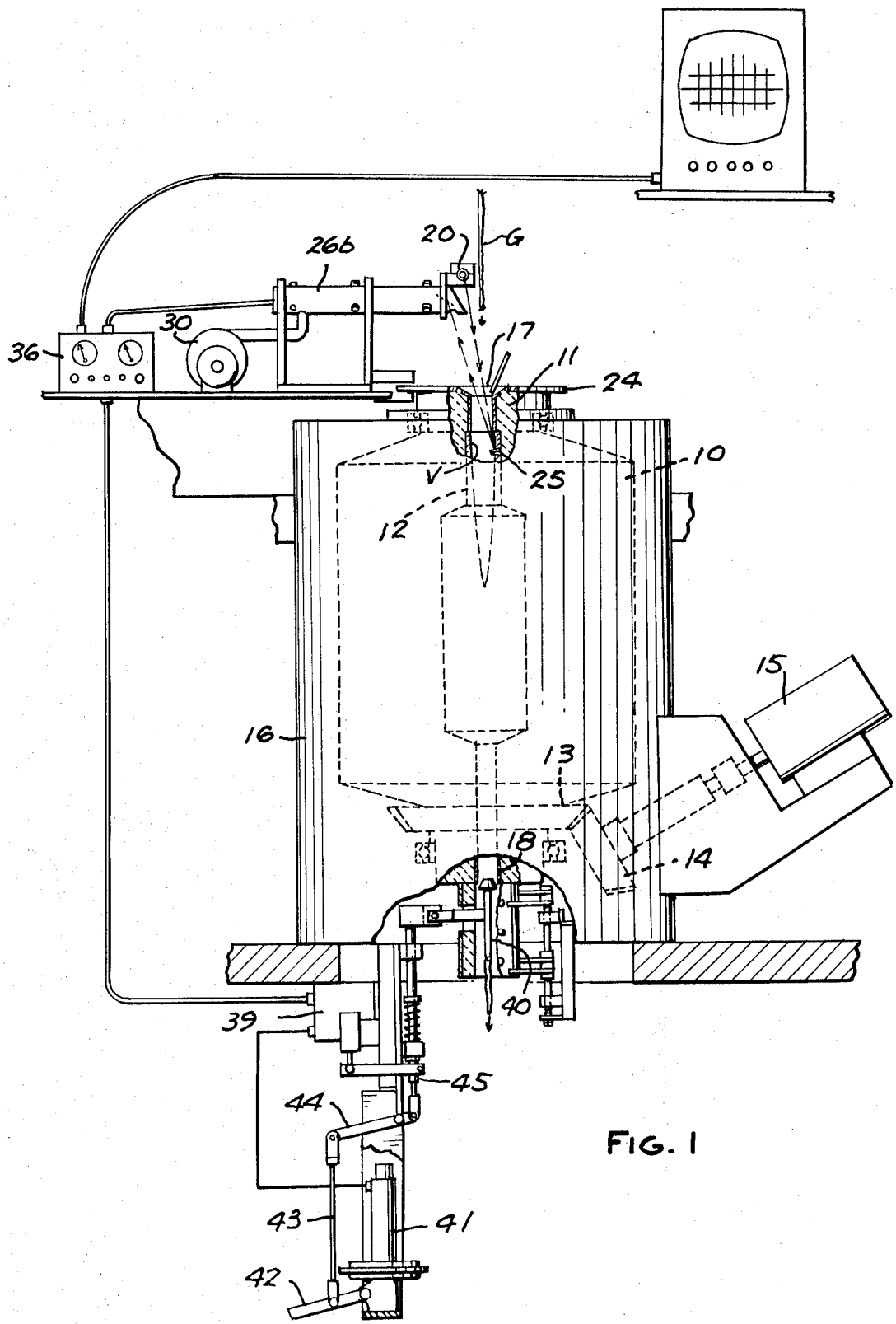
FIG. 1 is a part sectional partly diagrammatic elevational view of an apparatus embodying the invention.
Figure 3:
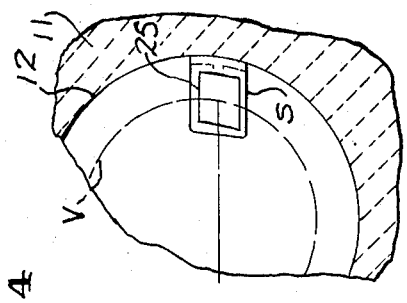
FIG. 3 is a fragmentary sectional view taken along the line 3—3 in FIG. 2.

Referring to FIG. 1, the apparatus shown comprises a rotatable container 10 that has a refractory liner 11 defining a chamber 12. The upper and lower ends of the chamber 12 are open and the container 10 is adapted to be rotated by meshing bevel gears 13, 14 which are rotated by a motor 15. The rotating container 10 is surrounded by stationary housing 16.

Glass is continuously introduced in a stream G into the open upper end 17 of the container and upon rotation of the container, a void V is produced due to centrifugal action. Gaseous inclusions in the glass are caused to move to the void, thus converting the unrefined molten glass to molten glass. The refined molten glass passes downwardly through the outlet 18 continuously. The aforementioned and described apparatus and method of operation thereof are more completely described in the aforementioned U.S. Pat. application Ser. No. 130,672, filed Apr. 2, 1971 now U.S. Pat No. 3,754,886.

In accordance with the invention, the diameter of the inner surface of the rotating mass of glass at a point adjacent the upper end of the void V is continuously sensed and this is used to control the efflux of glass from the outlet 18 or the feeding of unrefined molten glass to the chamber.

Figure 2:
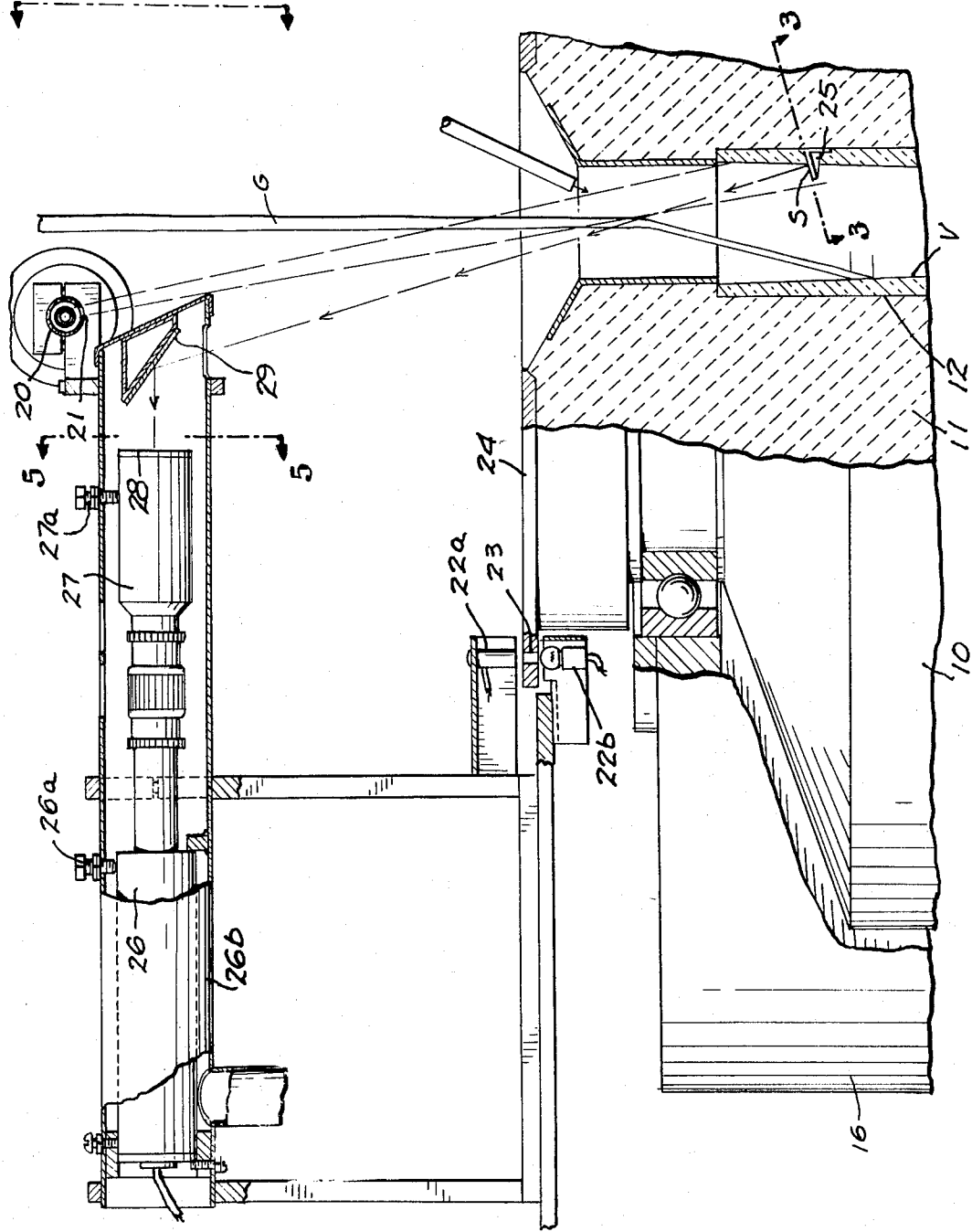
FIG. 2 is a part sectional elevational view on an enlarged scale of a portion of the apparatus shown in FIG. 1.
Figure 4:
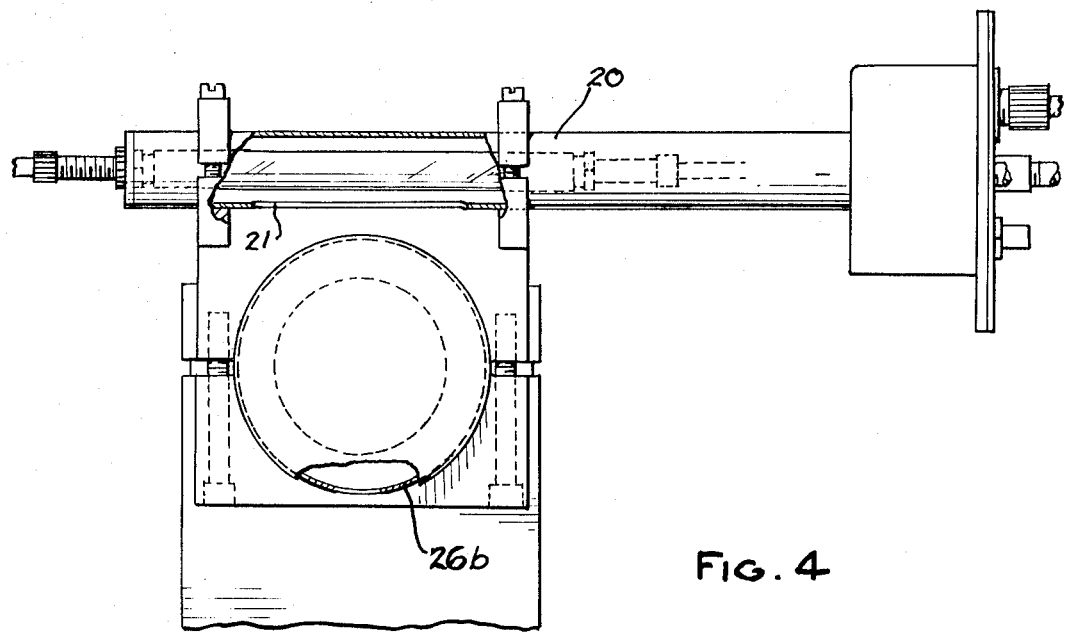
FIG. 4 is a part sectional view taken along the line 4—4 in FIG. 2.
Figure 5:
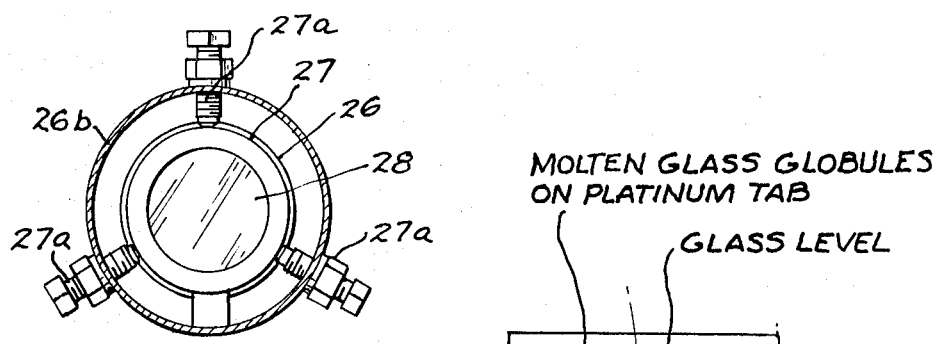
FIG. 5 is a sectional view on an enlarged scale taken along the line 5—5 in FIG. 2.

More specifically, as shown in FIGS. 1 and 2, radiant energy is emitted from a source 20 such as an ultraviolet tube that directs light through an elongated opening 21 onto a portion of the surface of the void V. The source 20 is a strobe light which is actuated periodically as the chamber rotates by a sensor 22a positioned to receive light from the bulb 22b passing through an opening 23 in a plate 24 that rotates with chamber 10 to provide an ultraviolet flash of light once for each revolution of the chamber.

A marker or tab 25 of platinum or other suitable material, is mounted on the inner surface of the chamber 12 and has a flat surface S that is positioned at a right angle to and in the path of the light from the source 20. Depending upon the amount of glass in the chamber, varying portions of the surface S are exposed to the light. The line of vision of a video camera 26 extends through a lens 27 and an ultraviolet filter 28 and is reflected by a mirror 29 so that the camera views the uncovered portion of the surface S of the tab 25 as the chamber rotates. Because of the relative reflectivity, when the uncovered portion of the marker is viewed, an image of the globules is provided. The camera 26 thus creates an image of the glass globules on the uncovered portion of the tab 25. As shown in FIG. 2, a housing 26a surrounds the camera and air is supplied to the housing from a blower 30 to cool the camera. Centering adjustment of the camera 26 and lens 27 is achieved by radial screws 26a, 27a. The filter 28 functions to remove the radiation from the hot molten glass so that the area of the marker may be viewed by the camera 26.

Figure 7:
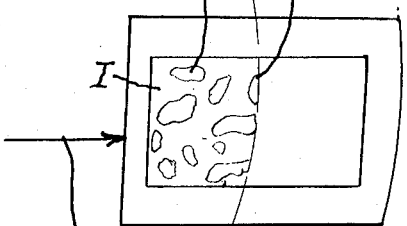
FIG. 7 is a diagram of the optical image produced by the apparatus.
Figure 6:
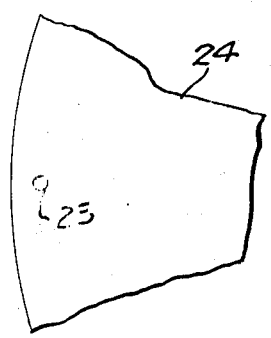
FIG. 6 is a fragmentary plan view of a portion of the apparatus shown in FIG. 2.

As shown in FIG. 7, a diagrammatic view of the image I of the surface is shown on a scale. The area of the image I which is exposed is inversely proportional to the thickness of the glass on the chamber wall 12. As shown in FIG. 7, the image of the uncovered portion of the marker 25 is not a clear unobstructed image because the marker has glass globules thereon due to splashing of glass and, as indicated above, the image created is that of the globules distributed over the uncovered portion of the marker.

Figure 8:
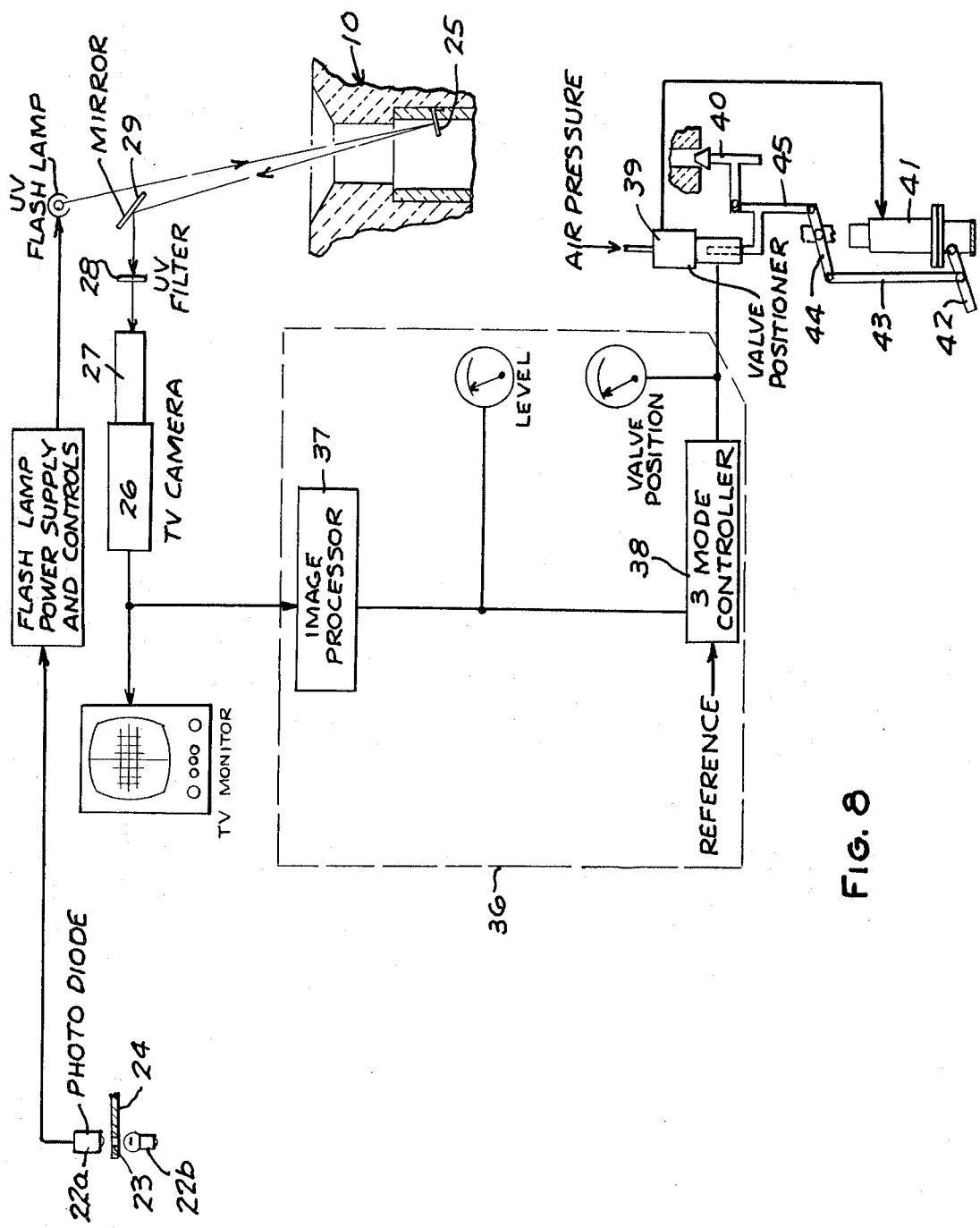
FIG. 8 is a partly diagrammatic block diagram of the control circuit for the apparatus.

A diagrammatic view is shown in FIG. 8 of the electronic circuit for operating the apparatus in which similar reference numerals are used for clarity. The image of the exposed portion of the marker 25 is viewed by camera 26 and displayed on a TV monitor 35. The image is also transmitted to a controller 36 which compares the image to a predetermined standard. When the image deviates from the standard by a predetermined amount, the comparator 36 produces a signal to control the flow of glass into or out of the chamber 10 and thereby control the amount of glass in the chamber.

Comparator 36 comprises an image processor 37 and a three mode controller 38 which controls a valve positioner 39. A rod 40 which controls efflux from chamber 10 is positioned by positioner 39 in response to any signal through a diaphragm motor 41 and linkage 42, 43, 44, 45. A mechanical feedback to positioner 39 assures accurate positioning in response to the signal. A similar structure may be used to control feeding of glass to the chamber rather than efflux therefrom.

Although the invention is particularly directed to the problem of sensing the amount of hot molten glass in the refining method described including the associated problems in connection therewith, it may also be used for sensing the amount of liquid in any container which is similarly rotated to produce a paraboloidal void in the rotating liquid.

We claim:

1. In the refining of molten glass wherein unrefined molten glass is continuously introduced into one end of an open-ended chamber, the chamber is continuously rotated to form a void and cause the gaseous inclusions to be removed by the action of centrifugal force and the glass is continuously removed from the other end of the chamber, the method of controlling the mass of glass in the rotating chamber which comprises the steps of:

directing a beam of ultraviolet radiant energy at least periodically against a portion of the inner surface of the void formed in the rotating mass of molten glass;

positioning a platinum marker in said chamber adjacent to the wall of the chamber so that the marker is in the path of the rotating glass mass such that varying portions of said marker are exposed to said directed radiant energy beam, the area of said portion of the marker exposed being dependent on the diameter of the void formed in the rotating mass of molten glass;

directing the line of vision of a video camera toward the area of the void and said marker, said area being periodically illuminated by said ultraviolet light radiant energy beam;

producing an image of the illuminated exposed portion of said marker by utilizing a reflected portion from said marker of said directed energy beam;

producing an electrical signal whenever the image of the exposed area of the marker deviates from a standard image by a pre-selected difference; and controlling the amount of molten glass in the chamber in response to said produced electrical signal by moving a chamber orifice blocking device into an orifice blocking position.

2. In a process of refining molten glass wherein unrefined molten glass is continuously introduced into one end of an open-ended chamber, the chamber is continuously rotated to form a void in the molten glass and thereby cause the gaseous inclusions to be removed by the action of centrifugal force and the molten glass is continuously removed from another end of the chamber, the method of controlling the mass of glass in the rotating chamber which comprises the steps of:

directing a beam of ultraviolet radiant energy at least periodically against a portion of the inner surface of the void;

positioning a platinum marker in the chamber, in the path of the rotating glass mass, adjacent to the wall of the chamber such that varying portions of the marker are exposed to said radiant energy dependent on the diameter of said void in the glass;

directing the line of vision of a video camera toward the area of the void which is periodically illuminated;

directing a portion of the energy beam from said marker to said video camera;

filtering the directed energy from said marker area to said camera to remove extraneous radiations from the molten glass apart from the reflected portion of ultraviolet light from said marker;

producing an image of the illuminated portion of said marker;

comparing the area of said image with a preselected area of said image;

producing a signal whenever the reflected image deviates from the standard area by a preselected amount;

and controlling the amount of glass in the chamber in response to said produced signal.

3. An apparatus for determining the diameter of a void in a mass of rotating molten glass which is rotated in a chamber about an axis to form said void said apparatus comprising means for directing a beam of ultraviolet radiant energy against at least a portion of the inner surface of the void;

a marker positioned within the chamber, in the path of the rotating glass mass, adjacent to the wall of the chamber such that varying portions of the marker are exposed to said radiant ultraviolet energy inversely proportional to the thickness of the molten glass in the chamber;

a video camera;

means for directing a line of vision of said video camera toward the area of the void which is illuminated;

means for creating an image of the exposed surface of the marker;
means for comparing the created image with a preselected standard image;
means for producing a signal whenever the image deviates from the standard by a preselected amount;
electrical means connected to said signal producing device electrically and operably connected to an orifice control device within the chamber;
and means for moving the orifice control device to control the amount of molten glass exiting the chamber.

* * * * *